3,168,518
ALKYL PEROXY TRIAZINES
James B. Harrison, 205 Hamilton Ave., Elyria, Ohio, and Orville L. Mageli, 81 Danbury Lane, Buffalo, N.Y.
No Drawing. Filed Jan. 23, 1964, Ser. No. 339,592
4 Claims. (Cl. 260—248)

The present invention relates to organic peroxides containing nitrogen in the molecule and particularly to triazines, as for instance the alkyl peroxy derivatives cyanuric chloride.

This is a continuation-in-part of Serial No. 69,562, filed November 16, 1960, now abandoned.

Cyanuric chloride in its simplest form may be considered to be NCOCl and is generally encountered in the trimer form, generally considered to be a six-membered nitrogen-carbon ring compound such as 2,4,6-trichloro-1,3,5-triazine.

In accordance with the principles of the present invention, the triazine is reacted by contact and generally in the presence of an inert organic solvent with an alkyl hydroperoxide, the amounts of triazine and alkyl hydroperoxide being stoichiometrically chosen whereby 1, 2 or 3 of the reactive chlorine atoms is replaced with an alkyl peroxy moiety.

The resulting structure is a heterocyclic ring compound in which carbon is combined with a trivalent nitrogen through a double bond and wherein there is union of carbon with peroxy oxygen.

In broad concept, the mode of preparation is to react the cyanuric chloride with the required amount of alkylhydroperoxide at low to moderate temperature in a solvent such as benzene, pentane or other suitably inert medium, in the presence of a moderately strong alkali either in the anhydrous state, as for instance pellets of potassium hydroxide or sodium hydroxide, or by the employment of very strong aqueous caustic. In general, the cyanuric chloride and the selected alkyl hydroperoxide are mixed with and in the inert solvent, such as benzene, the temperature of the reaction environment reduced to a desired low temperature, as for instance in the range $-10°$ to room temperature, and the alkali added in small increments with agitation.

Where it is desired to react one mol of the alkyl hydroperoxide with one mol of cyanuric chloride, generally there is added one mol of the caustic alkali, as for instance potassium hydroxide. After the addition of the required quantity of caustic, additional agitation is desirable at temperatures in the range heretofore given. The mixture is then separated, as for instance by drawing off the heavy lower aqueous salt layer from the organic layer. The residue of organic layer is then washed with sulfite, then with water, and dried over magnesium sulfate. This dried benzene solution is then preferably stripped under vacuum to give the desired peroxy triazine derivative.

The following specific examples are given to illustrate the preparation of the t-butyl derivatives.

Example 1

Into a three-necked flask equipped with thermometer, stirrer and separatory funnel, there is added a mixture of 6.32 parts by weight of cyanuric chloride (0.0343 mole), 3.09 parts by weight of t-butyl hydroperoxide (0.0343 mole) mixed in benzene. Thereafter, 4.98 grams of 45% aqueous potassium hydroxide (0.0343 mole) was added dropwise after the temperature of the reaction mixture had been reduced by external cooling to 0° C. During the addition the temperature rose in the range 6° C. to 10° C., the addition requiring about 8 minutes. The reaction mixture was then stirred vigorously for 1½ hours in the temperature range 10° C. to 14° C. The pH of the reaction environment at the end of the reaction period was pH 8 to pH 9.

The benzene fraction of the reaction mixture was separated, washed with a sulfite wash, twice with water, dried over magnesium sulfate, then filtered and the benzene stripped under 1–5 mm. Hg vacuum. The residue of yellowish liquid weighed 5.5 grams corresponding to a theoretical yield of 8.2 grams. The liquid possessed a refractive index correct $n_d^{20}$ 1.5005.

Calculated for $C_7H_9Cl_2N_3O_2$: Act. (O), 6.71. Found: Act. (O), 7.71 (high assay attributable probably to some chloride hydrolysis).

Example 2

The di-t-butyl peroxy derivative of cyanuric chloride was prepared by dissolving 6.32 parts by weight of cyanuric chloride (0.0343 mole) and 6.18 parts by weight of t-butyl hydroperoxide (0.0686 mole) in 60 cc. of benzene and after reducing the temperature of the mixture by external cooling to 6° C., 8.5 parts of 45% potassium hydroxide (0.0686 moles) was added dropwise over a 12-minute period of time, meanwhile maintaining the range of temperature 6° C. to 10° C. Under these conditions the potassium salt of the t-butyl hydroperoxide apparently formed and separated as a pasty solid and therefore 30 cc. of water was added and the solution stirred for 3 hours and permitted to rise to room temperature. The pH of the final solution was pH 12. The organic phase was separated, given a single sulfite wash to eliminate unreacted t-butyl hydroperoxide, a water wash and dried over magnesium sulfate. After stripping the benzene under vacuum 7.5 parts of a light yellow liquid was obtained which possessed $n_d^{20}$ 1.4806. This product possessed an active oxygen content of 10.57 as compared with a theoretical activity oxygen content of 10.96%.

The oily liquid was cooled by refrigeration and a crystalline mush mass was obtained. A solid was filtered off and recrystallized from petroleum ether. The solid possessed a melting point of 68° C. to 70° C.

Calculated for $C_{11}H_{18}ClN_3O_4$: Act. (O), 10.96. Found: Act. (O), 10.96.

Example 3

Tri (t-butyl peroxy)-s-triazine was prepared by producing the potassium salt of t-butyl hydroperoxide by mixing 90 parts by weight of 45% KOH with 240 parts of ice and water with 58 parts by weight of 91.5% t-butyl hydroperoxide to 10° C. using external cooling. About 3 drops of an anionic wetting agent (Triton X-200) and 26 parts by weight of cyanuric chloride dissolved in 300 parts by weight of benzene was added dropwise at 10° C. over a time period of 15 minutes.

The reaction mixture was stirred for an additional 15 minutes and the temperature permitted to rise to 22° C., the benzene layer was separated, any unreacted hydroperoxide destroyed with sulfite, the organic layer then washed with water, dried over magnesium sulfate, filtered and the solvent stripped under vacuum. A crude product 2.45 parts by weight was obtained indicating a yield of about 92%.

Calculated for $C_{15}H_{27}N_3O_6$: C, 52.15; H, 7.88; N, 12.17; A. (O) 13.90. Found: C, 52.72; H, 7.74; N, 14.48; A. (O) 13.37.

The triazines of the present invention are derivatives of cyanuric chloride

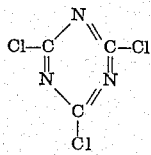

of the class formula

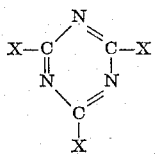

where X is the alkylperoxy group t-butylperoxy or chlorine and wherein at least one t-butylperoxy group is present.

The peroxy triazines of the present invention are useful as polymerization catalysts. They initiate many polymerizations in resins containing ethylenic unsaturation with particular reference to unsaturated polyester resins and polyethylene. They form a series from which may be chosen so-called high temperature catalysts as well as what are designated as low temperature catalysts. Thus, the symmetrical triazine, tri(t-butylperoxy)-s-triazine is a catalyst employable at higher temperatures than the 2,4-di-t-butylperoxy-6-chloro-s-triazine.

There is listed below, exotherm data obtained at two temperatures using a Minneapolis Honeywell single pen recorder, recording at the rate of one inch per minute when employing the standard S.P.I. exotherm test (report to the S.P.I. Reinforced Plastics Division Policy Committee on Polyester Resin Standards, S. Moore, Interchemical Corporation, May 18, 1959).

The tests were run on a standard resin of the following composition:

| | |
|---|---|
| Maleic anhydride _____ moles__ | 1.0 |
| Phthalic anhydride _____ do____ | 1.0 |
| Propylene glycol _____ do____ | 2.2 |
| Acid No. of alkyd resin _____ | 45–50 |
| Inhibitor added (hydroquinone) _____ percent__ | 0.013 |

7 parts of the above alkyd was diluted with 3 parts of styrene monomer.

The exotherm data obtained was as follows:

| | Benzoyl Peroxide | | 2,4-di-t-butylperoxy-6-chloro-3-triazine | | Tri-(t-butylperoxy) s-triazine | |
|---|---|---|---|---|---|---|
| | (a) | (b) | (a) | (b) | (a) | (b) |
| Bath temp., °F_____ | 180 | 240 | 180 | 240 | 180 | 240 |
| Gel time, min_____ | 4.5 | 0.2 | 2.2 | 1.3 | 10.4 | 2.3 |
| Cure time, min_____ | 6.2 | 1.1 | 4.3 | 2.2 | 15.0 | 3.4 |
| Peak exotherm, °F_____ | 420 | 422 | 360 | 392 | 370 | 463 |

It will be noted that the 2,4-di-t-butylperoxy-6-chloro-3-triazine had desirably a faster gel time than did benzoyl peroxide, and a faster cure time with a lower peak temperature. These characteristics are eminently desirable in the curing of relatively thick sections, when molding a polyester to produce a set resin.

In the crosslinking of polyethylene tri(t-butylperoxy)-s-triazine as a crosslinking agent was compared to the activity of dicumylperoxide, standard presently known and used crosslinking agent.

The crosslinking ability was shown by dissolving polyethylene specifically, a product of E. I. du Pont de Nemours and Co., known as Alathon 3, in xylene, adding 5% of the peroxy compound to be tested and heating on a hotplate, subsequently extracting the insoluble precipitated material formed in this procedure, the crosslinked product, with xylene, and weighing the amount of insoluble material. The results of such a test indicated crosslinking of 43% using the peroxy triazine, whereas dicumyl peroxide produced crosslinking of 37%.

The peroxy triazines induced crosslinking in polyethylene-carbon mixture of 25 grams polyethylene of the Alathon 10 type, and 20 grams of carbon black (Sterling MT). The crosslinking was determined by measuring the change in consistency (increase in torque) on the usual Brabender Plastograph, as compared to dicumyl peroxide as a reference, with the following results.

| Peroxide: | Increase in torque, meter grams |
|---|---|
| Dicup (0.5 g.) _____ | 800 |
| 2,4 - di - t - butylperoxy - 6 - chloro - 3 - triazine (0.5 g.) _____ | 860 |
| Tri(t-butylperoxy)-s-triazine (0.5 g.) _____ | 900 |

What is claimed is:
1. The triazine

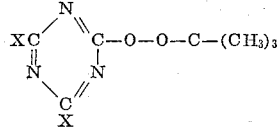

where X is a radical selected from the group consisting of chlorine and t-butylperoxy.
2. Mono t-butylperoxy-dichlorotriazine.
3. Di-(t-butylperoxy)monochlorotriazine.
4. Tri(t-butylperoxy)-3-triazine.

No references cited.